United States Patent [19]

Balbo

[11] Patent Number: 4,528,578

[45] Date of Patent: Jul. 9, 1985

[54] INK-JET PRINTER DAMPING

[75] Inventor: Edoardo Balbo, Banchette, Italy

[73] Assignee: Ing. C. Olivetti & C., S.p.A., Ivrea, Italy

[21] Appl. No.: 558,301

[22] Filed: Dec. 5, 1983

[30] Foreign Application Priority Data

Dec. 3, 1982 [IT] Italy .............................. 68424 A/82

[51] Int. Cl.[3] .............................................. G01D 15/18

[52] U.S. Cl. .................................... 346/140 R; 346/75

[58] Field of Search ............................... 346/140 R, 75

[56] References Cited

U.S. PATENT DOCUMENTS

| | | | |
|---|---|---|---|
| 3,683,212 | 8/1972 | Zoctan | 310/8.3 X |
| 4,149,172 | 4/1979 | Heinzl et al. | 346/140 R |
| 4,354,197 | 10/1982 | Reitberger | 346/140 R |
| 4,417,259 | 11/1983 | Maeda | 346/140 R |

*Primary Examiner*—E. A. Goldberg

*Assistant Examiner*—Gerald E. Preston

*Attorney, Agent, or Firm*—Banner, Birch, McKie & Beckett

[57] ABSTRACT

An ink-jet printer includes a reservoir filled with ink and a duct communicating with the reservoir and also filled with ink. The duct has an end portion with a capillary nozzle for projecting the ink and an intermediate portion between the reservoir and the end portion. Transducer means are associated with the end portion of the duct for generating a first pressure wave in the ink, which is directed towards the nozzle and causes a droplet of ink to be discharged through the nozzle. A second pressure wave associated with the first pressure wave is directed towards the intermediate portion of the duct and, to substantially absorb the energy of this second wave, the printer further includes an elongate damper which extends in contact with the ink in only the intermediate portion of the duct.

7 Claims, 4 Drawing Figures

INK-JET PRINTER DAMPING

The present invention relates to ink-jet printers and is particularly concerned with a printer comprising:

a reservoir filled with ink, a duct communicating with the reservoir and filled with ink, the duct having an end portion provided with a nozzle for projecting the ink and an intermediate portion between the reservoir and the end portion, transducer means associated with the end portion of the duct for generating a first pressure wave in the ink, which is directed towards the nozzle and causes a droplet of ink to be discharged through the nozzle, a second pressure wave being associated with the first pressure wave and being directed towards the intermediate portion of the duct.

The damping of the second pressure wave is essential for ensuring the correct operation of the printer. This pressure wave, which is propagated from the end portion of the duct towards the ink reservoir and will thus be referred to in the present description by the term reverse wave, is subject to reflection phenomena generated by discontinuities in the acoustic impedance normally present in the ink duct, particularly in the region between this duct and the reservoir. As a result of these reflections, the wave is propagated back towards the end portion of the duct where it interferes with the discharge of the ink droplets through the nozzle.

The subject of the present invention is a printer of the type specified above, characterised in that it includes an elongate damper element extending in contact with the ink in only the intermediate portion of the duct, the element substantially absorbing the energy of the second pressure wave.

By virtue of this characteristic, a printer is provided in which it is possible to achieve substantial absorption of the second pressure wave with a very small bulk, which allows very small printers to be made.

Figure 1:
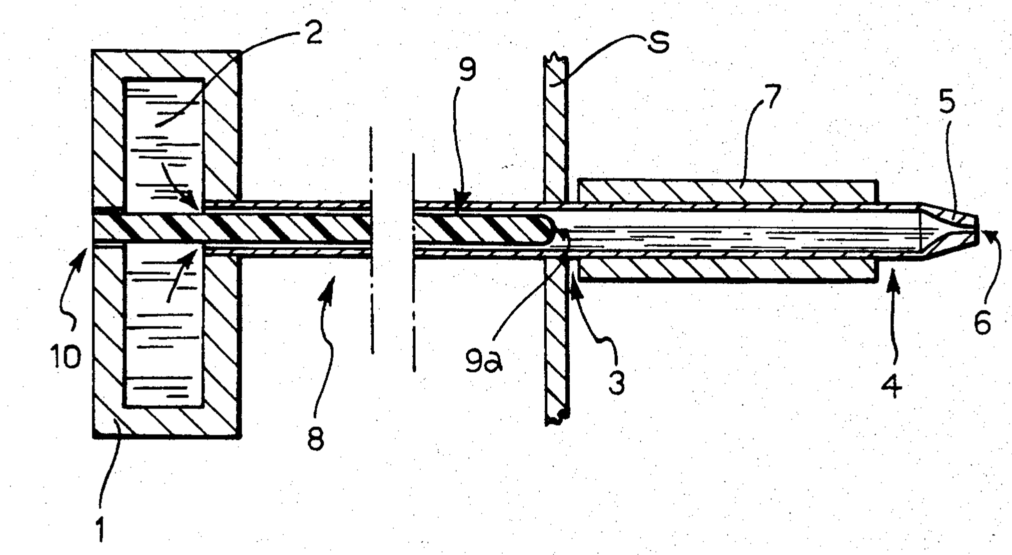

The invention will now be described, purely by way of non-limiting example, with reference to the appended drawings, in which:

FIG. 1 is an axial sectional view of a printer according to the invention, and

Figure 2:
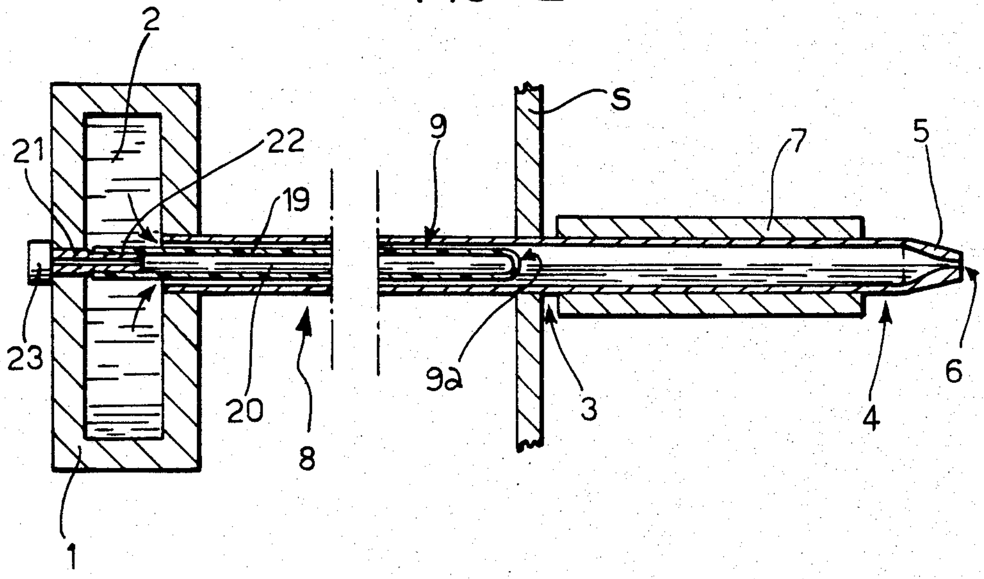
Figure 3:
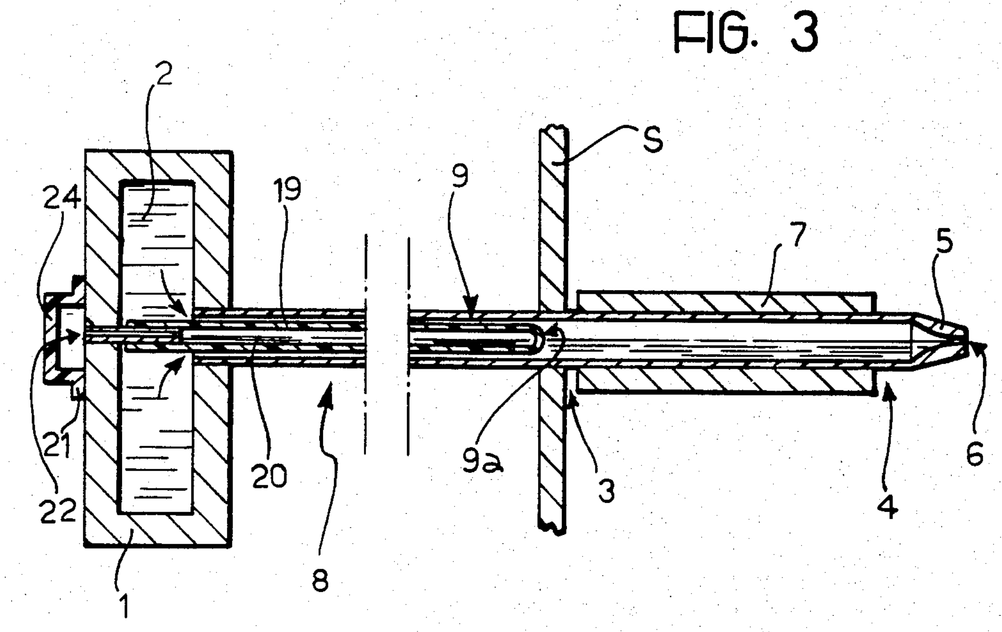
Figure 4:
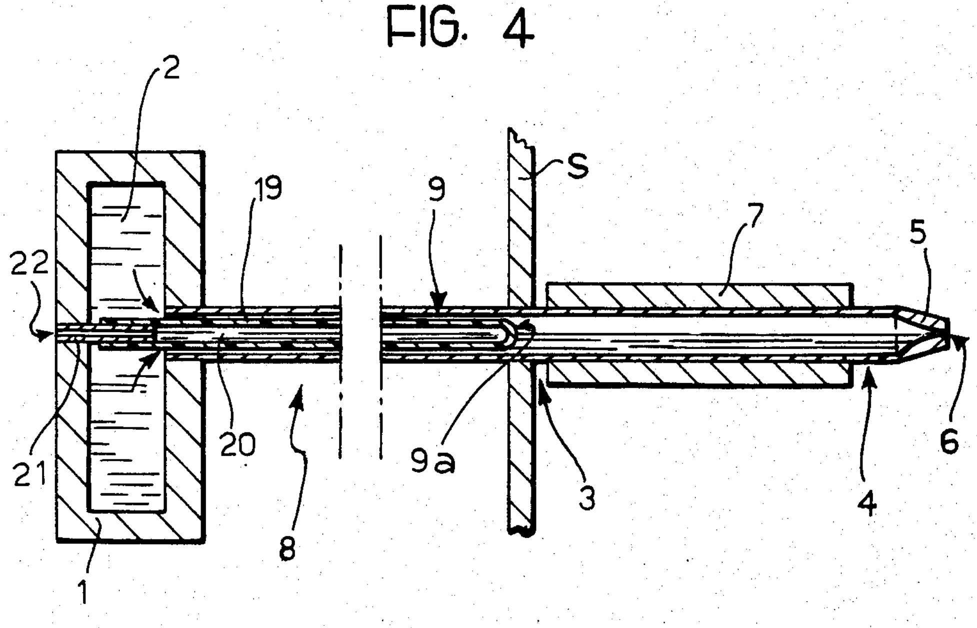

FIGS. 2 to 4 each illustrate a variant of the printer of FIG. 1.

In the drawings, a reservoir is indicated 1 and is filled with ink 2. The term "ink" is to be interpreted in the present description and in the following claims as referring to any liquid which can be used for a printing or writing process.

A tubular duct, generally indicated 3, communicates at one end with the reservoir 1 and is thus full of ink 2.

At its end opposite the reservoir 1, the duct 3 has an end portion 4 with an approximately constant cross-section over its entire length. The end portion 4 of the duct has a nozzle 5 with a capillary orifice 6 through which the ink in the end portion 4 of the duct 3 may be discharged from the printer in the form of droplets, in the manner which will be more fully described below.

The duct 3 is made of a material, such as glass, which gives the duct 3 a certain rigidity.

An electro-acoustic transducer 7 of annular form surrounds the end portion 4 of the duct 3 and is fixed to the glass wall of this portion so as to transmit mechanical forces to the wall itself. In the example described, the transducer 7 is constituted by a radially-polarised piezoelectric ceramic element. The transducer 7, which is of a known type has excitation electrodes, not illustrated, through which the transducer 7 can be given an electric excitation pulse, for example a cosine square pulse. As a result of the application of this pulse, the transducer 7 contracts so that its internal diameter is reduced. This reduction of the diameter of the transducer 7 corresponds to the transmission of a compressor wave to the wall of the end portion 4 of the duct 3. When the transducer 7 is excited, two pressure waves are generated within the ink in the end portion 4 of the duct 3, these being directed in opposite directions.

A first pressure wave is propagated towards the nozzle 5 causing the discharge of a droplet of ink through the orifice 6.

A second pressure wave, however, is propagated towards the portion of the duct 3 between the reservoir 1 and the end portion 4. This intermediate portion is generally indicated 8.

As mentioned above, in the device according to the invention, the duct 3 is contituted entirely by a glass tube. The end portion 4 thus extends as an elongation of the intermediate portion 8 which is, in its turn, connected to the reservoir 1 at its end opposite the end portion 4.

This arrangement is advantageous from various aspects.

In the first place, in the region between the end portion 4 and the intermediate portion 8, there are no surface discontinuities on the inner wall of the duct 3 which could result in reflection of the pressure wave (reverse wave) which is propagated towards the reservoir 1. These discontinuities are generally present, however, in printers in which the intermediate portion 8 of the duct 3 is made from a semi-rigid or flexible tube fitted onto the end of the end portion 4 opposite the nozzle 5. The use of a duct made entirely of glass is also advantageous in that the glass wall is in fact impermeable to air. Thus, the diffusion of air into the duct 3 is prevented. These phenomena do occur to a greater or lesser extent, however, when the intermediate portion 8 of the duct 3 is made from a material such as a plastics material. The arrangement described is also advantageous with regard to the overall strength of the printer, which is supported in its operative position by a support S.

The acoustic impedance of the duct 3 has a discontinuity in the region where it joins the reservoir 1. At the end of its propagation path within the intermediate portion 8 of the duct 3, the reverse wave is thus reflected towards the end portion 4 and the nozzle 5. This reflection may result in the undesired discharge of a droplet of ink from the orifice 6. Even when this does not occur, the reverse wave reflected towards the nozzle interferes with the discharge of a new droplet of ink through the orifice 6 when this discharge is effected by excitation of the transducer 7. This interference reduces the speed of the printer.

In the device according to the invention, this phenomenon is eliminated by achieving a substantial absorption of the reverse wave energy within the intermediate portion 8 of the duct 3.

In the drawings, an elongate cylindrical damper element, generally indicated 9, is disposed axially relative to the duct 3 and extends within only the intermediate portion 8 of the duct 3 itself.

The damper element 9 is in contact with the ink 2 and defines an annular flow chamber for the ink within the duct 3.

The damper element 9 is deformable under the action of the reverse wave which is propagated within the intermediate portion 8 of the duct 3.

The resilience of the damper 9 is determined so as to have the acoustic impedance of the intermediate portion 8 matching the acoustic impedance of the end portion of the duct. This avoids a discontinuity in the acoustic impedance of the duct 3 in the region between the two portions. Such a discontinuity in the acoustic impedance would in fact cause undesiderable reflection of the reverse wave towards the nozzle 5.

Thus, impedance matching may easily be achieved by taking account of the fact that the acoustic impedance Z of a duct can be expressed generally by means of a relationship of the type $$Z_\infty = \frac{\rho C_o}{A} \cdot \frac{1}{\sqrt{1 + F \cdot \frac{E_1}{E_2}}}$$

where $\rho$ is the density of the liquid (ink) contained within the duct, $C_o$ is the speed of sound in this liquid, A is the section of the duct itself, F is a factor which depends on the geometry and dimensions of the duct, and $E_1$ and $E_2$ are the elastic modulus of the liquid in the duct and the elastic modulus of the material forming the wall of the duct, respectively. A further refinement of the degree of impedance matching of the two portions 4, 8 of the duct 3 may be achieved experimentally. By way of reference, the intermediate portion 8 of the duct 3 normally has a diameter slightly less than 1 mm. The diameter of the damper 9 is typically of the order ½ mm.

Preferably, the damper element 9 has a rounded end 9*a* facing the end portion of the duct 3.

The damper element 9 may be formed in different manners.

In the embodiment illustrated in FIG. 1, the damper element 9 is made from an elastomeric material. Different elastomeric materials may be used for the manufacture of the damper element 9 which is intended to absorb the energy of the reverse pressure wave propagated within the intermediate portion of the duct 3.

It should be noted that the damper element 9 absorbs both the reverse wave which is propagated within the duct 3 towards the reservoir 1 and the fraction of this wave which rebounds towards the nozzle 5 as a result of reflections of this wave in the region between the duct 3 and the reservoir 1.

The damper element 9 is inserted within the device through a hole 10 provided, in one of the walls of the reservoir 1 in alignment with the axis of the duct 3. The end of the damper element 9 opposite the rounded ends 9*a* cooperates with the wall of the hole 10 so as to ensure the sealing of the reservoir 1, while ensuring the correct positioning of the damper element 9 within the duct 3. The length of the damper element 9 is selected so that its damping action is effected over practically the whole length of the intermediate portion 8 of the duct 3. This allows high absorption of the reverse wave to be achieved even when the intermediate portion of the duct 3 is of small length, significantly reducing the overall dimensions of the device.

It should also be noted that the damper element 9 extends within only the intermediate portion 8 of the duct 3 so as not to cause any noticeable absorption of the pressure wave which is propagated within the end portion 4 of the duct 3 towards the nozzle 5 in order to cause the discharge of a droplet of ink through the nozzle 5.

The variants illustrated in FIGS. 2 to 4 differ from the embodiment illustrated in FIG. 1 in that the damper element 9 comprises a tubular container 19 of resiliently deformable material (for example, polyvinyl chloride) which is filled with a viscous fluid 20 such as viscostatic oil or a silicone oil. Depending on the dimensions used, a satisfactory viscous effect may also be achieved by using a gaseous viscous fluid.

The elastic energy of the reverse pressure wave which is propagated through the ink in the duct 3 is transmitted by the resiliently deformable wall of the container 19 to the viscous fluid 20. This elastic energy is thus dissipated as a result of the movement of the viscous fluid caused by the deformation of the resilient wall of the tube 9. This results in a substantial absorption of the reverse wave and the elimination of its harmful effects on the discharge of the droplets on ink through the nozzle 5.

The resilient material constituting the container 19 and the dimensions of this container may be selected, as described above, to achieve an acoustic impedance in the intermediate portion 8 of the duct 3 which is adapted to the acoustic impedance of the end portion 4 of the duct. It is then possible to select the characteristics of the viscosity of the fluid constituting the filling 20 so as to achieve a high damping index of the reverse wave, even in printers in which the intermediate portion 8 of the duct is short.

In the embodiment illustrated in FIG. 2, the container 19 is fitted at its end opposite the rounded wall 9*a* onto a cylindrical support 21, fixed to one of the walls of the reservoir in an axial position relative to the duct 3. The support 21, which supports the container 19 within the duct 3, has a hole 22 which allows the filling of the container 19 and is subsequently closed by a stopper 23.

In the embodiment illustrated in FIG. 3, the hole 22 is intended instead to put the inner chamber of the container 19 into communication with a reservoir 24 having resiliently yieldable walls. The viscous fluid 20 (which may be a gas in this case also) may thus pass from the container 19 to the reservoir 24, and vice versa, through the hole 22. The diameter and the axial length of the hole 22 may thus be selected so that the hole 22 itself constitutes an aperture through which the fluid 20 is drawn.

In the embodiment of FIG. 4, air at atmospheric pressure is used as the viscous fluid filling the container 19.

The use of the reservoir 24 is thus rendered superfluous since the inner chamber of the container 19 may be put into direct communication with the external environment. The dimensions of the hole 22 are normally selected so as to give rise to capillary phenomena which increase the resistance of the hole to the passage of fluid, improving the viscous behaviours of the mass of fluid in the container 19.

I claim:

1. An ink jet printer comprising an ink reservoir, a tubular ink duct communicating at one end with said reservoir and provided at the other end with an ink projecting nozzle, said duct being made of a substantially rigid material, and a tubular transducer surrounding a first portion of said duct adjacent said nozzle for generating a first pressure wave in the ink, said first pressure wave being directed towards the nozzle to cause a droplet of ink to be discharged through the nozzle, while a second pressure wave associated with the first pressure wave is directed towards said reservoir, wherein the improvement includes an elongated cylindrical damper element located in a substantially coaxial position into another portion of said duct, as to form an annular flow chamber for the ink, said element being made of such a resilient material and being made so dimensioned that the acoustic impedance of said other portion with said damper element matches the acoustic impedance of said first portion of the duct so as to prevent said second pressure wave from reflecting toward said first portion, and that said damper element substantially absorbs the energy of said second pressure wave of the ink travelling into said annular flow chamber toward said reservoir.

2. A printing device as defined in claim 1, wherein the damper element is made of an elastomeric material and is connected at one end to a wall of said reservoir, the other end of said damper element being rounded.

3. Printer as defined in claim 1, wherein the damper element comprises an at least partly tubular container having at least one wall portion in contact with the ink in said intermediate portion of the duct and constituted by a material which is resiliently deformable under the action of said second pressure wave, and a filling of viscous fluid in said container.

4. A printer as defined in claim 3, wherein said container is partitioned internally into a plurality of chambers, and wherein the partitioning defines an aperture for the passage of said viscous fluid.

5. A printer as defined in claim 4, wherein said aperture has dimensions such as to give rise to capillary phenomena therein.

6. A printer as defined in claim 1, wherein said damper element comprises a tubular container having at least one wall portion in contact with the ink in said other portion of the duct and constituted by a material which is resiliently deformable under the action of said second pressure wave, and a capillary duct for putting the interior of said container into communication with the external environment.

7. A printer as defined in claim 6, wherein said capillary duct connecting the container with the external environment extends through a wall of the ink reservoir.

* * * * *